United States Patent
Inacio De Matos

(10) Patent No.: US 12,287,628 B2
(45) Date of Patent: Apr. 29, 2025

(54) METHOD AND SYSTEM TO IMPROVE AUTONOMOUS ROBOTIC SYSTEMS RESPONSIVE BEHAVIOR

(71) Applicant: Follow Inspiration, S.A., Fundao (PT)

(72) Inventor: Luis Carlos Inacio De Matos, Covilha (PT)

(73) Assignee: Follow Inspiration, S.A., Fundao (PT)

( * ) Notice: Subject to any disclaimer, the term of this patent is extended or adjusted under 35 U.S.C. 154(b) by 366 days.

(21) Appl. No.: 17/750,811

(22) Filed: May 23, 2022

(65) Prior Publication Data
US 2022/0291685 A1  Sep. 15, 2022

Related U.S. Application Data

(63) Continuation-in-part of application No. 16/478,020, filed as application No. PCT/IB2018/050317 on Jan. 18, 2018, now abandoned.

(30) Foreign Application Priority Data

Jan. 20, 2017  (PT) .......................... 109871

(51) Int. Cl.
G05D 1/00  (2024.01)
(52) U.S. Cl.
CPC ......... G05D 1/0088 (2013.01); G05D 1/0214 (2013.01); G05D 1/0238 (2013.01); G05D 1/0291 (2013.01)
(58) Field of Classification Search
None
See application file for complete search history.

(56) References Cited

U.S. PATENT DOCUMENTS

| | | |
|---|---|---|
| 10,126,747 B1 | 11/2018 | Svec et al. |
| 2003/0110423 A1 | 6/2003 | Helms et al. |
| 2005/0096790 A1 | 5/2005 | Tamura et al. |
| 2005/0216126 A1 | 9/2005 | Koselka et al. |

(Continued)

FOREIGN PATENT DOCUMENTS

| | | | |
|---|---|---|---|
| CN | 204797811 U | * | 11/2015 |
| WO | 2007034434 A2 | | 3/2007 |

(Continued)

OTHER PUBLICATIONS

International Search Report and Written Opinion dated Apr. 23, 2018 for International Application No. PCT/IB2018/050317 (12 pages).

*Primary Examiner* — Kyle T Johnson
*Assistant Examiner* — Arslan Azhar
(74) *Attorney, Agent, or Firm* — The Roy Gross Law Firm, LLC; Roy D. Gross

(57) ABSTRACT

A method and system to improve autonomous robotic system responsive behavior, to control the autonomous responsive behavior of a robotic system based on a set of simultaneously and cooperatively performed real-time action based on a plurality of acquisition sources providing relevant data about the surroundings of the system, wherein the data is processed by a set of modules globally controlled and managed by a Central Processing Module comprising a multitude of control and decision AI algorithms multidirectionally that allow define the autonomous responsive behaviors of the robotic system.

24 Claims, 3 Drawing Sheets

(56) References Cited

U.S. PATENT DOCUMENTS

| | | | |
|---|---|---|---|
| 2006/0106496 A1 | 5/2006 | Okamoto | |
| 2007/0192910 A1* | 8/2007 | Vu | H04N 7/142 901/1 |
| 2011/0026770 A1 | 2/2011 | Brookshire | |
| 2011/0228976 A1 | 9/2011 | Fitzgibbon et al. | |
| 2013/0338525 A1* | 12/2013 | Allen | A61B 5/742 600/534 |
| 2013/0342652 A1 | 12/2013 | Kikkeri et al. | |
| 2017/0200273 A1 | 7/2017 | Kamilov et al. | |
| 2017/0201614 A1 | 7/2017 | Deng et al. | |
| 2018/0067495 A1 | 3/2018 | Oder et al. | |
| 2018/0173237 A1 | 6/2018 | Reiley et al. | |
| 2018/0174451 A1 | 6/2018 | Rao | |

FOREIGN PATENT DOCUMENTS

| | | | |
|---|---|---|---|
| WO | 2007041295 | A2 | 4/2007 |
| WO | 2008005660 | A2 | 1/2008 |
| WO | 2013192477 | A1 | 12/2013 |
| WO | 2014045225 | A1 | 3/2014 |

* cited by examiner

METHOD AND SYSTEM TO IMPROVE AUTONOMOUS ROBOTIC SYSTEMS RESPONSIVE BEHAVIOR

CROSS-REFERENCE TO RELATED APPLICATION

This application is a continuation-in-part of Ser. No. 16/478,020 filed Jul. 15, 2019, which is a 371 of PCT/IB2018/050317 filed Jan. 18, 2018, which in turn claims the benefit of Portuguese Patent Application No. 109871 filed Jan. 20, 2017, the contents of each application are incorporated herein by reference.

TECHNICAL DOMAIN

The present application discloses a method and system to improve autonomous robotic system responsive behavior.

BACKGROUND OF THE INVENTION

A growing interest in robotics with applications as diverse as industry and service rendering is nowadays observed. There are, however, several challenges yet to be solved ranging from hardware conceptualization and development of software in tasks such as calculating path and obstacle detour, to the most abstract and complex level of human-machine interaction. Some important contributions have already been made, some of which are summarized below.

US20050216126A1 discloses an autonomous personal robot with the ability to identify, track and learn the habits of a particular person in order to detect the occurrence of unusual events. The main purpose of the solution is to help elderly and disabled people and to report their status as well as the status of their environment. This idea differs from that herein presented in several aspects, namely in that it has been designed for a specific user.

The idea proposed in US2006106496A1 describes a method for controlling the movement of a mobile robot. The work focuses on the methods being that the existence of a conventional robot whose structure is not totally defined is assumed. This work differs from that herein proposed essentially in the description of the robot and sensors thereof. While in US2006106496A1 a camera is mentioned, for example, the existence of not only RGB but also depth cameras is herein suggested.

WO2007034434A2 discloses a system for tracking an object or person using RGB video. The video is analyzed through logical processing, using an algorithm of correspondence between blocks. This algorithm defines a pixel block in an image and tries to find the same block, within a certain search region, in the next video image. The search region is dynamically adapted based on the history of the measured values. The tracking algorithm used, however, does not take account of the displacement of the robotic system itself relative to said reference 'object'.

US20110026770A1 discloses a method for using a remote vehicle provided with a stereo vision camera. The camera allows detecting and tracking of a person. The goal of the method is to develop a system that allows humans and remote vehicles to collaborate in real environments. The solution also allows the navigation of the remote vehicle to an appropriate location relative to the person, without, however, providing for the tracking of objects in this context.

The work presented in US2011228976A1 describes techniques for generating synthetic images for the purpose of being used by an automatic learning algorithm for a joint-based tracking system. The present work includes not only a set of algorithms for data and image processing, but also an autonomous robotic system.

US20130342652A1 discloses a tracking method which is generally used to track a person through a robot with an RGB and depth camera. One of the major differences with the invention proposed in the present application is that in addition to the RGB and depth cameras (which are herein admitted to be more than one), the tracking and contouring of obstacles also provides for the use of at least one LRF. Safety can be further enhanced by one or more sonars.

WO2014045225A1 discloses an autonomous system for tracking an individual with a capacity to deviate from obstacles, being limited exclusively to this locomotion mode and being unable to autonomously circulate. In addition, the operator recognition is made only on the basis of a depth camera which makes the identification processing itself less robust and subject to failure, in addition, its application being limited to artificial light scenarios (controlled light).

In this way, it is observed that, in practice, the known solutions are omitted in terms of the development of a robotic system that promotes a complete integration with the environment where it is inserted, both at the level of interaction with the user and with the surrounding environment.

The herein disclosed Autonomous Robotic Transportation and Tracking System provides a universal solution for autonomous operation of robotic systems, particularly improving their autonomous behavior with regard to the surrounding environment where they are inserted and also improving interaction with their direct users or individuals. It particularly discloses a system and method to improve autonomous robotic system

SUMMARY OF THE INVENTION

The present invention discloses a method to control and improve the autonomous responsive behavior of a robotic system based on a set of simultaneously and cooperatively performed real-time actions comprising sensorial data acquisition from predetermined features of a surrounding environment where the robotic system is inserted, said sensorial data acquisition being performed by a Sensory Module through the combination of a range of sensors and cameras therein comprised; interactive data acquisition from at least a movement or an action or one physiognomy characteristic of a user of the robotic system, said interactive data acquisition being performed by an Interaction Module through the combination of a set of data acquisition means therein comprised; power supplying the overall modules of the robotic system through a Power Module; providing data locomotion instructions to a Locomotion Module configured to ensure the overall movement of the robotic system through locomotion means therein comprised; data communication exchange between the robotic system and at least one remote monitoring system, said data communication exchange being provided by a Communication Module through communication means; and safe operation monitoring of the robotic system autonomous responsive behavior through a Safety Management Module through the combination of a set of monitoring means; wherein said Sensory Module, Interaction Module, Power Module, Locomotion Module, Communication Module and Safety Management Module are comprised in the robotic system and are globally controlled and managed by a Central Processing Module comprising a multitude of control and decision AI algorithms multidirectionally connected to said modules that allow to exchange data therewith and define the autonomous responsive behaviors of the robotic system.

In one of the proposed embodiments of the present invention, the method to control and improve the autonomous responsive behavior of a robotic system comprises transportation management of a cargo to deliver to a predetermined location, said management being ensured through a Transportation Module configured to ensure cargo pickup and replace said cargo, which is further controlled and managed by the Central Processing Module.

In another embodiment, the multitude of control and decision AI algorithms of the Central Processing Module comprise at least one of a Docking Algorithm, or a Mission-Action Translation Algorithm, or a Graph Search Algorithm, or a Global Planning Algorithm, or a Local Planning And Obstacle Avoidance Algorithm, or a Task Manager, or a Blockage Management Algorithm, or a Transportation Control Algorithm, or a Traffic Control Algorithm, or a Travel Time Statistics Algorithm, or a Visual Line Follower Algorithm, or a Vertical Objects And Vault Detection Algorithm, or a Logging Algorithm, or a User Tracking Algorithm, or a Motion Tracking Algorithm, or a Mapping And Localization Algorithm, or a Diagnostic Algorithm.

In another embodiment, the combination of data provided by the range of sensors and cameras of the Sensory Module allows to determine a space occupancy map comprising relative height, width and depth information of the surrounding environment and/or objects around the robotic system, as well as ground depressions.

In another embodiment, the data locomotion instructions are monitored, controlled and provided autonomously by the Central Processing Module, based on the sensorial data acquisition, the interactive data acquisition, the data communication exchange and the safe operation monitoring.

In another embodiment, the adequate data acquisition means of the Interaction Module are further configured to establish bidirectional point-to-point connections with an external agent in order to ensure at least the autonomous remote operation of the robotic system at least by means of a remote control or a station, a remote team operation through cooperation of data and instructions with similar robotic systems, and automatic or supervised software updates to internal hardware comprised in the robotic system.

In another embodiment, the autonomous responsive behaviors of the robotic system comprise at least pick up, transport and replace cargo loads at a determined location; track an individual or a user; open doors; perform warehouse tasks; and switch between different preprogramed or autonomous operation modes and tasks.

In another embodiment, the Docking Algorithm recognizes and locates specific targets, said target recognition and location comprising at least shape or color characteristics, based on data acquired from the sensory module, the locomotion module and the transport module.

In another embodiment, the Mission-Action Translation Algorithm translates instructions provided from a Fleet Management System server in autonomous actions.

In another embodiment, the Graph Search Algorithm determines the best possible route to a received target destination based on the evaluation of segments of a navigation grid or a graph.

In another embodiment, the Global Planning Algorithm determines the best coordinates and orientation to execute the target destination based on the determined best possible route.

In another embodiment, the Local Planning and Obstacle Avoidance Algorithm recalculates in real-time each segment of a path covered towards the target destination according to surrounding conditions and obstacles of the robotic system.

In another embodiment, the Task Manager controls the execution of autonomous actions from the remaining algorithms controlling their execution and internal coordination within the Central Processing Module.

In another embodiment, the Blockage Management Algorithm determines if the robotic system is blocked or stalled based on the sensorial data acquisition.

In another embodiment, the Transportation Control Algorithm implements all the control logic required to execute the transportation management of a cargo.

In another embodiment, the Traffic Control Algorithm ensures the communication of Central Processing Module with the Fleet Management System server when the robotic system is entering and leaving traffic hotspot zones.

In another embodiment, the Travel Time Statistics Algorithm determines journey times for each route and each segment, storing said times locally and on the Fleet Management System server.

In another embodiment, the Visual Line Follower Algorithm locates and recognizes painted lines on the ground based on the sensorial data acquisition.

In another embodiment, the Vertical Objects And Vault Detection Algorithm recognizes objects located over or below a predetermined height, as well as depressions on the ground, based on sensorial data acquisition.

In another embodiment, the Logging Algorithm stores locally and remotely in the Fleet Management System server all the information about a diagnostic status of each module of the robotic system.

In another embodiment, the User Tracking Algorithm locates, recognizes and uniquely identifies people, in particular the user of the robotic system, defining a target that the Locomotion Module will use to follow user movements, based on sensorial data acquisition.

In another embodiment, the Motion Tracking Algorithm identifies surrounding movement around the robotic system based on sensorial data acquisition.

In another embodiment, the Mapping and Localization Algorithm stores environment information from the sensorial data acquisition and fuses it in a navigation map which includes surrounding detected obstacles of the robotic system.

In another embodiment, the Diagnostic Algorithm evaluates hardware and internal software operation status, publishing error signals and generating alarms.

Yet in another embodiment of the present invention, it is disclosed a system to control the autonomous responsive behavior of a robot according to the previous mentioned method claims, comprising a combination of modules comprising at least a Sensory Module, a Locomotion Control Module, an Interaction Module, a Power Module, a Safety Management Module, a Transportation Module and a Communication Module; said modules being globally controlled and managed by an additional Central Processing Module comprised within the robot which is configured to control said modules through a multitude of control and decision AI algorithms which are multidirectionally connected to said modules allowing to exchange data therewith and define the autonomous responsive behaviors of the robotic system.

DETAILED DESCRIPTION OF THE INVENTION

This presently disclosed technological development allows to provide improvements within several behavioral features of a robotic system at the user tracking level, user guidance, natural autonomous navigation, load transportation, docking to structures, trolley displacement, load pick and place, communication with devices and external systems, among others. It improves functionality of each of the operation modes priorly mentioned with information collected from other adjacent modes and previous executed tasks.

As a complete system, and overall solution for the existing autonomous robotic systems, the herein disclosed system and method to improve the responsive behavior of said robotic system, providing it with behavioral autonomy, is capable of solving several problems that arise from the use of more specialized and complex systems. It addresses reusability problems that are very frequent in the industry, where robotic systems are fixed/linked to specific tasks, and by so, unable to optimize its standby time performing the different roles and use cases available. The herein improved technological disclosure allows to address more complex scenarios to the robotic systems, where the implementation of the entire process would be impossible within a single robotic unit, and by so, inefficient in terms of resource utilization and cost management. For example, with the current development, the robotic systems will be able to pick up, transport and unload/place/replace loads at a determined location, track an individual or a user, automatically open doors or perform various warehouse functions/tasks, seamlessly switching between different preprogramed or autonomous operation modes and tasks.

The flexibility and implementation of complementary and collaborative methods within the internal behavior of the system, improves overall operating security and performance of movements and operation decisioning. Multiple algorithms process, distribute and share data in a collaborative way, enhancing efficiency and optimization level on all functions.

The present application arises from the need to make a robotic system more rational and 'conscious' favoring its complete integration in the environment around it.

For this purpose, an autonomous robotic system has been developed with the ability to define its actions according to data coming from at least three different types of 'information sources':
  sensory information collected directly from the environment where the robotic system is inserted,
  inputs provided by the operator of the robotic system, and
  external context information sent by information systems external to the robotic system.

Real-time integration of all these data, coming from different entities and sources, endows the system with an intelligence that allows it to operate according to different operation modes, according to the function assigned thereto, allowing it to operate exclusively following its user or alternatively to move autonomously directly to a particular defined point.

The robotic system developed shall be herein defined according to the technical modules that constitute the same and which create the necessary technical complexity allowing the robotic system to operate according to the principles already mentioned. The modularity of the system herein presented is verified both in terms of software and hardware, in practical terms providing a great advantage since it allows programming different operating functions adapted to certain application scenarios and in that any changes required to system hardware may be implemented without a direct impact on its overall operation. For example, the sensory module can be equipped as a more robust range of sensors if the robotic system is programmed for the user's tracking mode, both in artificial and natural light. The abstraction layer provided by the sensory module favors the integration of the new sensors introduced in the system.

The robotic system is comprised at least by the following technical modules:
  sensory module,
  monitoring module,
  interaction module,
  central processing module,
  power module, and
  locomotion module.

This modularity allows for faster processing and greater flexibility in introducing features when needed.

In line with this, the robotic system is equipped with several processing units, at least one per module, to the detriment of a single unit that would necessarily be more complex, in particular in the handling such large amounts of information provided by such modules. Due to the high volume of data involved, for example those provided by the sensory module, as well as the complexity of the analytical and decision algorithms developed, decentralization of processing represents a development approach that favors both the energy requirements, while maintaining the consumption within acceptable limits, and the space restrictions that the robotic system is to comply in order to properly perform its functions within its practical application scenario. In this way, it is possible from the beginning to separate the processing unit destined to treat the sensory data, which represents the computationally more demanding module of the others. Communication between all modules of the robotic system is established through a communication sub-module associated with the processing unit present in each module, said module being configured to establish communication based on a CAN protocol, Ethernet protocol or any other hardware communication protocol.

In spite of this modularity, the whole operation of the robotic system is programmed from the central processing module, where the rational stage is processed that integrates the information sent by the sensory module, interaction module, power module and monitoring module in order to drive the locomotion module, responsible for the displacement of the system.

Next, the modules that define the robotic system shall be described.

Central Processing Module

This is the main module controlling all other modules of the robotic system.

This is the module where crucial decisions are made regarding the operation mode of the robotic system, in terms of defining its autonomous behaviors such as user tracking (without the need for any identification device therewith), displacement in guiding mode (the user follows the robotic system) or the simple displacement between two points. Regardless of the operation mode in which the robotic system is configured, the central processing module activates the locomotion module by integrating data provided from the remaining modules of the robotic system. The decision as to which behavior to perform is based on the information collected by the sensory modules—sensors and cameras—and interaction module—receiving a local or remote order from the user or from an external agent, respectively. The processing of all information sources is performed according to "status" and "behaviors" selection algorithms, such as status machines, Markov models, etc.

Safe navigation of the robotic system (detouring of obstacles and ensuring safety distances) means that the central processing module correctly supplies the locomotion system with the correct instructions. For this purpose, data coming from the various sensors, or modules, that provide information not only complementary but also redundant, and that allow the recognition of the surrounding environment, are integrated. In addition, through the interaction module, the central processing module can complement this information with the use of maps implementing algorithms for calculating paths with obstacle detour and/or using global positioning techniques. In effect, it is possible for the central processing module to:
- generate a path based on a map provided by an external agent;
- build maps through local and/or global algorithms based on information collected by the sensory module;
- give information to the user about the surrounding environment.

For example, based on the calculations of the central processing module, it is possible to determine and characterize whether the robotic system is in a circulation zone or in a parking area; and to indicate to a user that he is approaching a narrow passage where the robot will not be able to pass. This acquaintance also allows to indicate to the user where the robotic system is located for the purpose of rendering services (points of interest at airports, advertising or purchase support in the presence of a list).

In this context, it is possible to run artificial intelligence (AI) algorithms in the central processing module which allow the robotic system to be informed of the user's preferences/history and thus providing effective interactions. For example, and in the context of a retail area, depending on the location of the robotic system, it is possible to suggest certain products that, depending on the user's shopping profile, may be to his liking.

All examples mentioned are possible thanks to the intercommunication between all modules that constitute the robotic system presented. The effective integration of information assigned to each one of them allows optimizing the operation of the system from the intended function, its user and context information regarding the environment wherein it is inserted.

Resorting to sensory information, it can also be done by the central processing module to stop the robotic system from moving, forcing an emergency stop due to a nearby obstacle. This emergency stop can also be caused by hardware through a button located on the robot's body.

Sensory Module

The sensory module is configured and responsible for collecting information and data from the surrounding environment where the robotic system is inserted. It is the computationally more complex module because of the amount of data and volume it needs to compute and process. It comprises at least the following range of sensors:
- at least one distance sensor;
- at least one RGB sensor;
- at least one sonar sensor (with an operating frequency in the ultrasound or infrared range);
- at least one sensor with LIDAR technology;
- at least one Laser Range Finder (LRF) sensor.

In addition, the sensory module also includes the display system of the robot. It is comprised by multiple cameras, with dynamic behavior according to the horizontal and vertical axes, of different types:
- RGBD;
- RGB;
- Thermal;
- Stereo, among others.

In order to deal with the volume of sensory data treated herein, this sensory module has a decentralized data processing strategy, having a processing unit per type of sensor or camera applied in the robotic system. Therefore, there is a previous sensory processing step prior to transmitting the resulting data to the main processing unit of the module via a hardware communication protocol (of the CAN, profiBUS, EtherCAT, ModBus or Ethernet type, for example) which will integrate all collected information therewith before forwarding it to the central processing module.

The number of sensors/cameras employed is variable depending on the intended application, which will always be mounted on the robot's body, where its precise positioning according to the intended application is varied. For such adaptability to be possible, the sensory module integrates a calibration block that is designed to automatically configure the new installed components, thus creating an abstraction layer that favors the integration thereof in the robotic system.

The combination of different types of sensors/cameras, with complementary and also redundant features, leads to better performance in terms of obstacle detection and detection and identification of objects and people, as well as greater robustness and protection against hardware failure. In fact, the recognition of the surrounding environment—people, obstacles, other robotic systems, zones or markers—is done through image processing algorithms, run in the main processing unit of this sensory module, later forwarding this information to the central processing module that is responsible for triggering the locomotion module accordingly. As far as the identification of the operator is concerned, i.e., the user of the robotic system, the use of sensors complementary to the depth information makes this process more efficient, allowing the use of RGB information, for example in order to extract color characteristics (among others) that allow characterizing the operator more accurately regardless of the lighting characteristics present. In this case, the process of identifying both the user and objects goes through an initial phase of creating a model based on features taken from the depth and color information. New information on the user/object detected at each instant is compared with the existing model, and it is decided/identified whether the result is the user/object or not, based on matching algorithms. The model is adapted over time based on AI and learning algorithms, which allow the adjustment of the visual characteristics of the user/object, over time, during its operation.

It is also possible with the features of this module to recognize actions performed by users that allow, among other applications, a more advanced man-robot interaction. In addition, it is also possible to operate the robotic system in an environment with natural or artificial light due to the presence of RGB and stereo cameras.

Interaction Module

The interaction module is the module responsible for establishing a bidirectional interface and communication between the robotic system, its user and with agents external to both. The interaction with the user, is processed at least through a set of data acquisition means that might comprise microphones, monitors, cameras, speakers, etc., the allow the interaction of the user with the robotic system to be processed through gestures (movements or actions), or voice, or physiognomy characteristics of the user (facial recognition, body structure such as height and width of certain limbs of the user) for example. In order to support said hardware, image processing algorithms, namely depth and color information (it presupposes that the sensory module has the technical means for such, i.e., at least one sensor for capturing depth information, for example a RGBD type sensor and/or a stereo camera, and at least one RGBD camera, for example for collecting color information) and word recognition are executed in the processing unit associated with this module, allowing the interaction with the user to be done via sound (microphone and/or speakers) or visual manner (through the monitor). This example exposes the interaction and integration between the information collected by all modules comprising the robotic system, and which provide different types of contact with its user or surrounding environment.

In turn, the robotic system is provided with the ability to interact with an external agent, which in this case is considered to be, for example, an information server housed on the internet, which the robotic system uses to obtain context information. To this end, this interaction module comprises a sub-module for communicating with the outside context sources, and configured to operate according to WI-FI, Bluetooth, LAN or IR technologies, for example.

In addition, this module allows establishing bidirectional point-to-point connections with other equipment external to the robotic system itself for the following purposes:
  teleoperation of the robotic system through a remote control or station, allowing to receive orders from an external device and sharing therewith monitoring information about the status of the sensors and actuators or status of the processes;
  team operation, through cooperation between robotic systems at different levels—this functionality consists in using the communication capabilities described in the previous point for the exchange of information among the various robots that may be operating in a given scenario. Robots can share all information they have and receive/give orders to others. One may, for example, consider that the robot to be used is always the one with the most battery. In this sense, it is necessary to be acquainted with the battery status of all of them. Another possible application is the optimization of work, where each robot makes a route dependent on the routes of the other robots (it is not worth two robots to pass through the same place each with half load, for example);
  performing automatic or supervised software updates through interconnection to a central command computer.

Monitoring Module

The monitoring module is intended to monitor the status of all other modules of the robotic system, controlling different parameters associated therewith, such as processor temperature, speed and load of existing processing units; used RAM memory and storage space; engine controller temperature of the locomotion module; speed and position of the robot, power level of the battery etc. To this end, the monitoring module is connected to each of the other modules of the robotic system, in particular to the respective processing unit, which share information on the parameters mentioned.

Power Module

In order to ensure the powering of all the electrical components of the robotic system, a power module is enclosed therein. The power module comprises at least one battery bank adapted to the robotic system and a wired and/or wireless charging system that promotes the energy transfer to said battery bank.

The wired charging system is based on a contact plug that directly connects the power supply to the robot's battery. On the other hand, the wireless charging system is based on the use of electromagnetism (radio signals, electromagnetic waves, or equivalent terms) to transfer energy between two points through the air. There is a fixed transmitter (or several) in the environment and the power module of the robotic system comprises a built-in receiver. When the receiver is close to the transmitter (not necessarily in contact) there is a transfer of energy. This system has advantages over physical connections in high pollution environments (e.g. industry) and in applications where the robot has to be coupled to the charging station autonomously (it simplifies the coupling process because location accuracy is not necessary). The Transmitter and Receiver are essentially constituted by a coil that, on the side of the transmitter is supplied by a variable electric current in the time that will generate a variable electric field. From the receiver side, the electric current generated in the coil is used by excitation based on the magnetic field produced. The power module is also equipped with processing capacity to control the transmitter and the monitoring of the electric charge on the side of the robotic system, being in interconnection with the other modules of the system, in particular the monitoring modules and central processing module. This interaction between all modules allows, for example, that the robotic system has the notion of the level of electric charge it has at any moment, causing it to be directed to the charging base autonomously whenever necessary. Beyond the common use of lithium or gel-acid on the battery bank, the energy transfer between docking/charging station the robot can resort to the use of UPS, automatic chargers, charging pads, power control boards or other types of energy transfer technologies perfectly adapted to ensure the reload of the internal battery bank.

Locomotion Module

The locomotion module is responsible for the displacement of the robot. As mentioned, this module is in communication with the central processing module receiving from the later information according to three vectors: speed, direction and orientation. The abstraction layer created at the software level in its processing unit allows different types of steering systems to be adapted by means of respective hardware changes: differential steering, Ackermann steering and omnidirectional steering. The locomotion means of the Locomotion Module are mainly comprised of at least two wheels, two independent electrical motors, motion control drives, encoders, circuit control boards or PLCs, brakes and mechanical support parts.

BRIEF DESCRIPTION OF THE FIGURES

For better understanding of the present application, figures representing preferred embodiments are herein attached which, however, are not intended to limit the technique disclosed herein.

DESCRIPTION OF THE EMBODIMENTS

Figure 1:
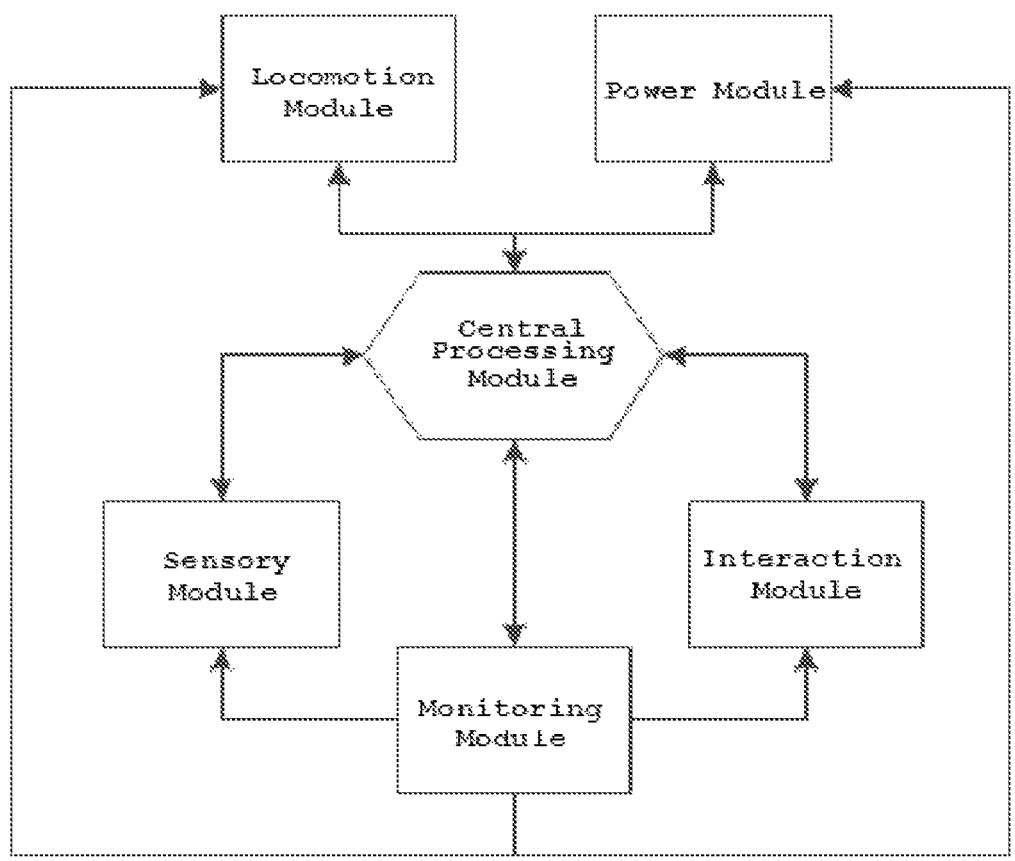
FIG. 1 shows the different blocks comprising the developed robotic system as well as the interactions established between them.
Figure 2:
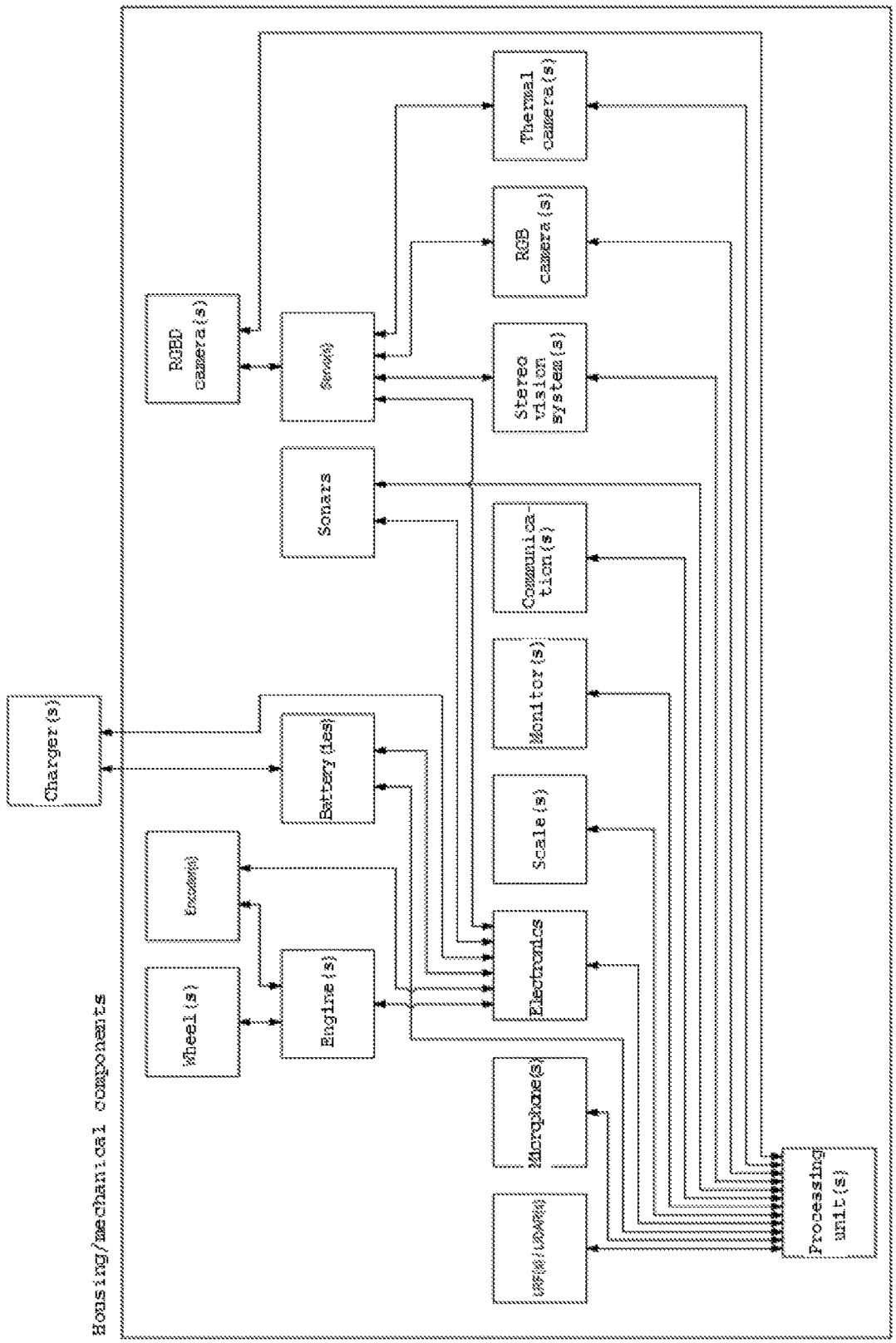
FIG. 2 shows a particular embodiment of the robotic system, especially adapted for the application scenario on a retail area, assisting its user.
Figure 3:
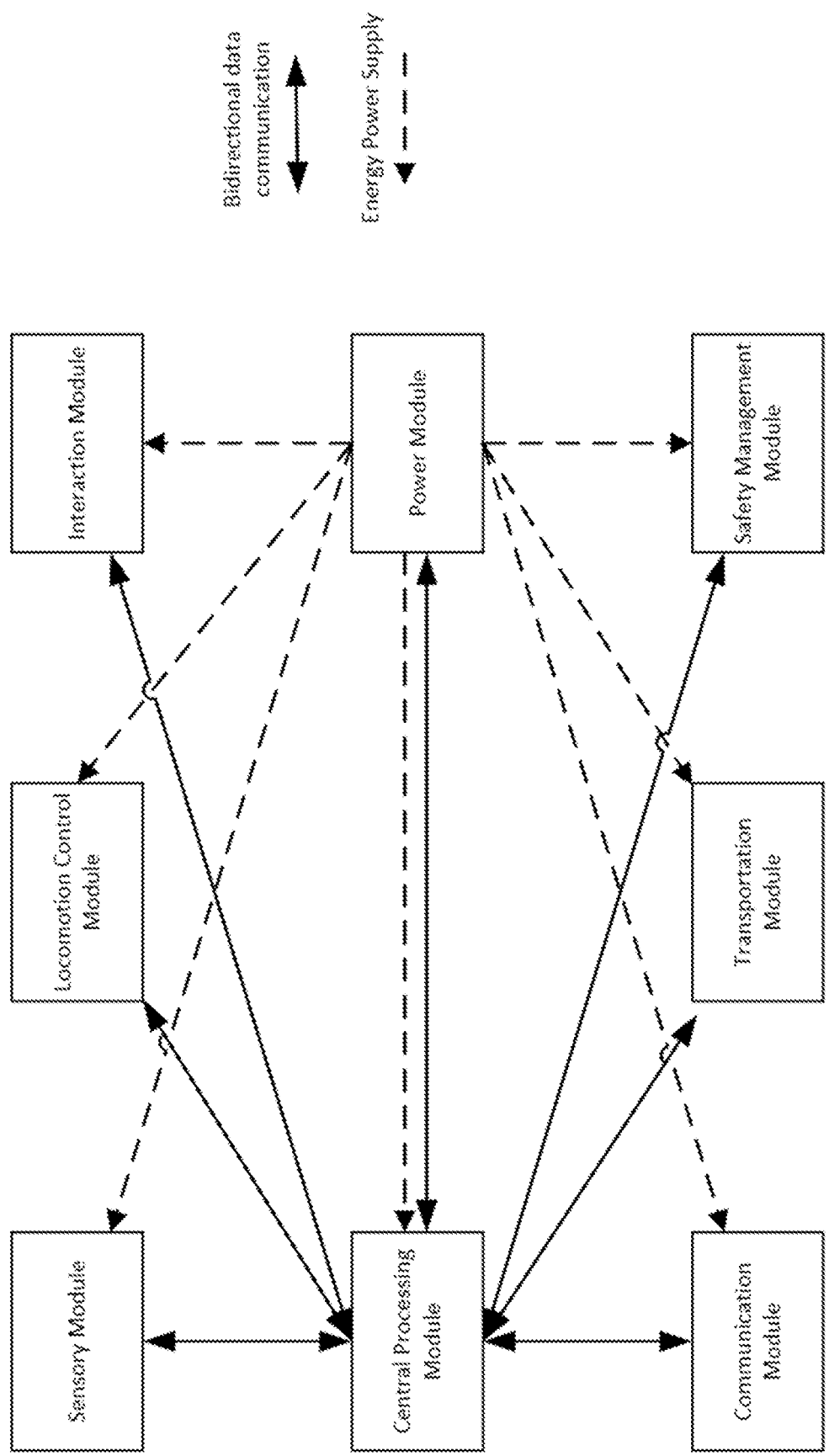
FIG. 3 shows a particular embodiment of the new method and system to improve autonomous robotic systems responsive behavior which disclose the bidirectional data communication links between the Central Processing Module, and the Sensory Module, the Locomotion Control Module, the Interaction Module, the Power Module, the Safety Management Module, the Transportation Module and the Communication Module. Additionally, it is also represented the Energy Power Supply links provided by the Power Module to all the remaining modules of the updated system.

With reference to the figures, some embodiments are now described in more detail, which are however not intended to limit the scope of the present application.

A particular embodiment of the autonomous robotic system disclosed herein is intended for the application scenario on a retail area. Taking into account the purpose and specificities defining the application context, the robotic system would be equipped with a scale and a physical support with loading capacity so that it can follow its user carrying the selected products. The navigation inside the commercial area would then be defined according to the user's tracking and depending on the area where the robotic system is located, the system can interact therewith by informing the user about special promotions or special products accessible in that particular area. Alternatively, navigation of the robotic system can be performed from the identification and interpretation of discrete markers which are strategically arranged in the surrounding environment. Depending on the geometric characteristics of the corridor, the robotic system can integrate in its locomotion module an omnidirectional steering system, allowing the robot to move in tighter spaces and in a smoother way. In this scenario, the locomotion module comprises an omnidirectional wheel which is composed of several smaller wheels, wherein these have the axis perpendicular to the main wheel axis. This allows the wheel to engage friction in a specific direction and does not provide resistance to movement in other directions.

In this particular embodiment, the Interaction Module of the robotic system would access the retail area server in order to download the map of the commercial area where it would navigate, information relating to specific products, promotions and/or preferred data associated with the user, interacting with the later, through the monitor or sound speakers. The three-plane connection, robotic system—user—data server of the retail area, allows the user to create his own shopping list locally by interacting with the robot itself or to upload it directly from his mobile device or from the retail area data server.

Within the framework of rendering of services, the robotic system may comprise an automatic payment terminal, comprising a barcode reader and billing software so that the payment act can also be supported by the robot.

Still within a commercial area or industrial environment, the robotic system can assist with stock replenishment, integrating sensory information, global location and image processing algorithms to identify and upload missing products to a specific location.

Similar applications can be designed for the autonomous robotic system presented herein, such as at airports, for passenger tracking, autonomous carriage of suitcases and passengers between points or provision of information services.

In another application scenario, the robotic system can be integrated into a vehicle, making it autonomous and therefore allowing actions to be performed without the need for driver intervention, such as automatic parking, autonomous driving (based on traffic sign recognition) or remote control of the vehicle itself or of a set of other vehicles in an integrated manner (platooning). To this end, the Central Control Unit of the vehicle is adapted to receive high level orders from the central processing module of the robotic system, connected thereto (position, orientation and speed), wherein the remaining modules of the system—sensory, monitoring and interaction modules—are also tailored to their integration into the vehicle.

The Locomotion and Power Modules are those of the vehicle itself, which are also integrated and controlled by the central processing module of the robotic system. In this context, the external agent may be considered the driver of the vehicle itself or a data server configured to communicate with the robotic system providing useful road information or to control the action of the vehicle itself or set of vehicles via a mobile application. The identification of the driver is also possible herein and in the case of the tracking action, the vehicle equipped with the now developed robotic system can be programmed to track another vehicle (for example), the position being detected through the sensory system.

Based on the previous cited description, the Sensory Module is configured to capture and fuse all the collected information from the surrounding environment of the robotic system, said information/sensorial data acquisition being provided by at least two laser LiDAR (Light Detection And Ranging) sensors, at least two RGB-D (Red Green Blue-Depth) cameras, at least one IMU (Inertial measurement unit), and optionally, in order to provide a more robust and accurate response to the daily basis challenges, it may also comprise sonars, 3D cameras, RFIDs (Radio Frequency Identification Devices), Barcode readers, movement sensors or thermal sensors.

The mentioned data fusion of the collected data by the cameras and lasers installed in said module is achieved by the creation of a space occupancy map and through the interpretation of said data. The cameras are configured to obtain the relative height, width and depth information of the surrounding objects wherein the robotic system is inserted, providing complementary info and data to the one acquired by the lasers for example. With this technical approach, the overall performance of the sensory module is improved in terms of safety and reliability once the surrounding dimensional space of the robotic system are determined and recognized with more proficiency, ensuring safe navigation within a constant dynamic and changing environment replete of obstacles at various heights and depressions in the ground.

Additionally, the Interaction Module is configured to receive remote-control actions provided by remote controlling units like, e.g., tablets, smartphones, or other technically adapted devices, and also provide feedback over the resulting actions executed. The present module of the robotic system may also comprise LED strips, speakers, buzzers, sensors, warning-lights, screens and/or touchscreens, push-buttons, Augmented Reality glasses, etc., in order to provide a more effective communication between the user and the robotic system and ensure correct info disclosure to the user and receive corresponding user interaction via existing communication devices. The mentioned remote-control devices are used to manually move and guide the robotic system. Within some of the possible executable actions is the ability to start and stop the mapping of procedures, configure paths, destinations and particular areas, define and trigger missions, monitor hardware status, configure operational parameters and connection with the Fleet Management System (FMS) server. The Fleet Management System server aims to centralize all information needed for operation management of the autonomous robotic systems deployed and operating one or more locations. It additionally provides robot configuration, alert mechanisms, mission creation and attribution, map and path synchronization, diagnostic and task execution monitoring, statistical information, device connection setup, API for connection with external systems and others.

As previously mentioned, the robotic system is provided with the ability to interact external agents, providing the robotic system with contextual information which may comprise at least one of a Map or Occupancy grid information, Orders or Missions to perform, Statistical information, Path characteristics and definitions, speed limited access and warning areas, Global operation definitions and Traffic information.

The existence of additional modules, such as the Communication Module ensures a proficient communication between the robotic system and a Fleet Management System server, an external IT system and/or external complementing devices like charging stations, warehouse machines, cargo lifts, doors, transportation modules among others. Technically, the communication means of the Communication Module are, for example, comprised of fixed or preferably wireless state of the art communication technologies like mobile, WiFi, Bluetooth, network adapters, ethernet ports, IR receivers or PLCs, just to name a few. In one of the preferred embodiments, the communication module is configured to create its own wireless network and connect itself to existing VPNs, synchronizing and communicating all the collected information and data across the remaining modules of the robotic system with external agents, which in turn may include diagnostic and mission data, alerts, map data, path information and others. The Communication Module is also connected to the Central Processing Module, exchanging data therewith which may comprise at least one of a diagnostic data, mission execution feedback, alerts, map data. Said data will also be broadcast to external agents through wireless communications technologies.

An additional Transportation Module is also included in the robotic system and is responsible for ensuring the cargo transportation of goods of the user, additionally ensuring their pickup and/or delivery on warehouse or user facilities. This module can comprise the addition of different mechanical and electrical modules, which may be connected and/or mechanically fitted to the robotic system, ensuring the communication and powering integration with the remaining modules. The transportation module, being modular, can comprise a lifting module, an indexing module, a conveyor module, a scissors elevating module, a tug module or others particularly adapted to the needs of the final user of the robotic system.

Finally, the inclusion of a Safety Management Module is also included in the overall architecture of the robotic system and is responsible for assuring safe operation of the autonomous robotic system in all the operating conditions. The monitoring means of the Safety Management Module are mainly comprised of safety encoders and safety PLCs which are configured to collect information from the laser LIDARs. The safety PLCs process information from the safety encoders and the laser LIDARs and evaluate in which conditions it is safe or unsafe to maintain the current robotic system behavior. It implements safety actions in response to safety warnings from external safety agents, and also publishes safety warnings to those systems. Additionally integrates warning data with external safety agents like warehouse safety PLCs. The Safety Management Module communicates internally directly with the Sensory Module and the Locomotion Module, exchanging information and sensory data with them. Additionally, this safety module communicates with the priorly mentioned external agents via the Communication Module to keep them updated of any hazards in the surrounding environment of the robotic system.

In one of the preferred embodiments, the Central Processing Module comprises a multitude of control and decision AI algorithms multidirectionally connected that allow to exchange data with the remaining modules of the robotic system. Within the range of multiple control and decisioning algorithms are included at least: Docking Algorithms, Mission-Action Translation Algorithms, Graph Search Algorithms, Global Planning Algorithm, Local Planning And Obstacle Avoidance Algorithm, Task Manager, Blockage Management Algorithm, Transportation Control Algorithms, Traffic Control Algorithm, Travel Time Statistics Algorithm, Visual Line Follower Algorithm, Vertical Objects And Vault Detection Algorithm, Logging Algorithm, User Tracking Algorithms, Motion Tracking Algorithm, Mapping And Localization Algorithms, and Diagnostic Algorithms.

The Docking Algorithm of the Central Processing Module comprise AI and trained neural networks or laser scan driven algorithms, configured to recognize and locate specific targets. The target recognition is obtained through shape recognition of info provided by both LIDAR lasers and RGB-D cameras. The resulting data provided by the docking algorithm allows to instruct and control the locomotion module to autonomously navigate the robotic system and index the identified targets in a way that allows it to be perfectly aligned in front, above or under the defined target. Targets may include charging stations, trolleys, benches, warehouse machines, lifts, doors and others. The required data for the target identification within the docking algorithm requires data provision from the sensory module, the locomotion module and the transport module. The target is then identified when both the laser and camera readings match above a certain threshold percentage with a predefined model definition of the object to be identified.

The Mission-Action Translation Algorithm is configured to receive orders from the Fleet Management System server (by means of the communication module) and translate said orders to autonomous actions that the robotic system can interpret and execute, acting over the locomotion module through instructions outputted to the Task Manager. These autonomous actions can be navigation actions, functional control actions (like docking and undocking) or order cancellation logic.

The Graph Search Algorithm receives target locations and calculates the best possible route to said target, based on physical and motion characteristics of the robotic system, the resulting calculation being obtained through a search algorithm that evaluates all segments of the navigation grid, and/or graph, taking into account each segment properties. This navigation grid consists of all the navigation points and their edges, defined in the path management interface, and they are stored locally in the robot and in the remotely located Fleet Management System. The herein provided grid solution uses a graph search algorithm, which automatically chooses the best path among the possible ones, improving performance results when compared with remaining competing technologies. The resulting output of the calculation obtained within this algorithm is forwarded to the Global Planning Algorithm.

In turn, the Global Planning Algorithm, will receive the route from the Graph Search Algorithm and will calculate the best coordinates and orientation to execute the proposed path, ensuring also the avoidance of all known physical obstacles in the determined path. To note that the coordinates of known physical obstacles are stored on the space occupancy map configured in the Central Processing Module. Departing from the coordinates of the points defined in the navigation grid, intermediate on-the-run coordinates and orientations are calculated in real time, which feed the robot's navigation engine and provide autonomous decisioning features. The system positioning is continuously determined by the Localization Algorithms described further ahead. The Global Planning Algorithm will output to the Local Planning and Obstacle Avoidance Algorithm the linear paths to implement to enable the robots to optimally reach the destination. Although apparently similar, the Graph Search Algorithm is configured to identify the best path for the robotic system to use within the path network, while the Global Planner Algorithm defines actual linear paths to be followed by the robot system during the on-the-run displacement.

The Local Planning and Obstacle Avoidance Algorithm will receive a plan from the Global Planning Algorithm and will ensure its execution, recalculating in real-time each segment of path covered within the performed movements according to real life conditions and obstacles. These obstacles are determined by the navigation map provided by the Mapping and Localization Algorithm described further ahead. The global planning algorithm defines paths in order to avoid these obstacles. This algorithm is capable of real-time definition of new routes around static or unexpected moving objects and makes use of the Sensory Module and the Locomotion Module. Based on the identification of obstacles by sensors, this algorithm defines new paths in real time in order to circumvent them. The central problem is the need to be able to safely avoid obstacles that were not included in the original map, including people or other moving elements. The solution involves sensory detection of these obstacles, including categorization as to whether they are static or moving. Based on this detection, alternative navigation arcs are generated around the obstacles to help identify the best trajectory, i.e., one that allows us to safely avoid the obstacle and stay as close as possible to the original path.

A Task Manager is responsible for receiving autonomous actions from the surrounding algorithms of the Central Processing Unit and controlling their execution and internal coordination. Each internal action type will trigger a state machine where the different stages of execution are to be managed. The Task Manager also resorts to the use of the Communication Module to ensure the communications between adjacent algorithms and modules. The robot is therefore autonomous in executing the planned tasks. Task planning is done at the Fleet Management System level, reactively to human inputs or automatically based on general operation settings. The autonomy of the robot is at the level of choosing the best paths to follow, redefining these paths when necessary to avoid obstacles, and validating the execution of its tasks/actions.

Along with the remaining algorithms of the Central Processing Module, a Blockage Management Algorithm is configured to receive information from Sensory Module and based on that information decide whether the robot is considered to be blocked or stalled. Whenever this situation is verified, the Task Manager is alert via the Communications Module, and the current algorithm implements blockage recovery actions, which may include retreating, rotating or defining alternative routes to the target.

A Transportation Control Algorithm is configured to implement all the control logic required to execute the Transportation Module actions, such as lifting actions, indexing actions (for example, magnetic bench index), conveyor control actions, scissor control actions and others. This algorithm receives and provides functional and operational instructions from and to the Task Manager supported by the operations of the Communications Module.

The Traffic Control Algorithm ensures the communication of Central Processing Module with the Fleet Management System server when the robotic system is entering and leaving traffic hotspots. The received travel or rejection authorizations sent by the server to the present module algorithm is ensured by the Communications Module, and those implement auxiliary movements that command the Locomotion Module and instruct to wait in predetermined areas when the cross-through area is rejected and recovers original paths when cross-through junctions are cleared. The server determines the positioning of robots through the positioning information they share with regard to the entrance or exiting special areas. It authorizes and/or rejects crossings between special areas according to criteria defined in the configuration of each restricted crossing area: direction priority, robot priority, mission priority, etc.

The Travel Time Statistics Algorithm is configured to calculate journey times for each route and each segment, storing this information locally and on the Fleet Management System server, to be further used as a decision argument on route choosing algorithms. To accomplish this, it collects info from the Locomotion Module and the Communication Module. The Visual Line Follower Algorithm is configured to use camera information received from Sensory Module to recognize and locate painted lines on the ground. Controls the Locomotion Module to navigate the robot in the quest of following line position and direction.

The Vertical Objects and Vault Detection Algorithm uses camera information received from Sensory Module to recognize objects that are over or below laser scan height and depressions on the ground. The information gathered by the cameras is used to detect obstacles that the laser cannot detect. The laser analyzes data on a single plane, and therefore cannot identify obstacles higher or lower than this defined plane. These objects are then considered obstacles and projected on the laser scan point cloud readings. The problem to be solved is based on the need to avoid the collision with objects that are at a height that does not allow their identification by the lasers, as well as detect stairs, ditches or other depressions on the flour that endanger the safety of the robot's movement. Obstacle implement and unevenness detection is obtained through information provided by RGB-D cameras, being the information projected as obstacles on the occupation map that the robot uses to guide its navigation.

The Logging Algorithm stores locally and/or sends to Fleet Management System server all the information about the diagnostic status of each and every module of the robotic system and also order execution status.

The User Tracking Algorithm uses camera and laser information provided by the Sensory Module to recognize, locate and uniquely identify people, in particular the user of the robotic system, defining a target that the Locomotion Module will use to follow user movements.

The Motion Tracking Algorithm uses laser and camera information from Sensory Module to identify movement around the robotic system. This recognition is used to track a moving object, follow its movements, or to safely stop the robotic system when no movement in the surroundings is allowed during operation.

The Mapping and Localization Algorithms stores environment information from the Sensory Module and fuses it to form a navigation map, including all detected obstacles. Information from the lasers and the cameras is fused together and allows to adapt to various environments in an optimal way, weighting the weight that each source has in the system. Solves the problem of recognizing the surrounding environment without importing architectural files. Performs live matching between scanned obstacles and the navigation map, providing adjustment coordinates according to matching confidence.

Finally, the Diagnostic Algorithm evaluates hardware operationality of the robotic system, as well as internal software status, publishing error signals and generating alarms.

Within the features of the Central Processing Module that promote the improvement of the autonomous robotic system responsive behavior, particularly with respect to the autonomous decisioning performance in the predefined user tracking, said processing module is configured to autonomously detect human physiognomic shapes in the surrounding environment wherein inserted, detect specific user face physiognomy, determine on-the-run movement by analyzing clusters of detected obstacles, define displacements that keep the targeted user at a specific distance. In another of the possible operating mode, in particular in the displacement in guiding mode of a user, the Central Processing Module is configured to also autonomously detect human physiognomic shapes in the surrounding environment wherein inserted, detect specific user face physiognomy, actuate over Locomotion Module to ensure the correct movement of the robotic system to a determined destination location and also wait for the user in guidance assistance if a distance threshold between them is triggered. In the simple displacement of the robotic system between two points, defined e.g. by a remote server or remote-control unit order, the Central Processing Module is configured to calculates the best route to the destination, based on all possible paths, define an optimal path to the destination, evaluates the presence of obstacles within the pathed route, recalculate path routes on-the-run and in real-time optimizing trajectories around obstacles and evaluating if the determined destination location has been reached. Additional operating mode is ensured by the Central Processing Module, in particular a transportation mode, which is configured to safeguard all the controls and all the operational functions required to pick-up, carry and deposit loads, interconnect with warehouse machinery and devices (ensuring synchronization between load transfer, open doors, control lifts, received signals from buttons, etc), index data to structures and manage the displacement of trolleys or other accessory equipment.

In one of the preferred embodiments, the Central Processing Module (CPM) is configured to control the autonomous responsive behavior of the robotic system, and particularly in an autonomous navigation mode, said module is configured to determine a set of routes the system may take based on recorded prior performance statistics (which may comprise transit times, occurred blockage or maximum deployment speed), distance to target and obstacle information previously detected by the system. Based on the determined set, the module will then determine the best path to target, based on a space occupancy map of the surrounding environment and obstacle information identified on-the-run in real time by the sensors of the sensory module. The CPM also determines the convenience or need to recalculate the path, based on new obstacles detected in real time by the sensors. It evaluates when the target is reached. Controls docking and undocking routines and the execution of all major operational tasks instructed. In the user tracking mode, the CPM controls the switching between operating states, particularly between detection state and tracking state. It also evaluates human features based on sensor information and decides which detected user is the main target for tracking. It controls the distance to the user while tracking, to maintain a target threshold. In guidance mode, the CPM takes all the decisions related to the autonomous navigation mode except docking/undocking (Indexing and trolley transport) and operational task execution. Additionally, it takes all the decisions related to the user tracking mode but based on the rear side sensors and cameras.

The processing of all information sources is performed according to a "status" and "behavior" selection of algorithms, such which include decisioning algorithm networks, graph search algorithms, status machines, Markov models, statistical analysis, and intersection algorithms.

The previously disclosed combination of technical features and algorithms defined to control and provide the proposed robotic system with improved autonomous responsive behavior allows to ensure the improvement of the tracking and obstacle contouring skills, as well as identifying in a more accurate way all the characteristics of the user regardless of the lighting conditions, ensuring the absence of flaws, enhancing the safety and mobility of the autonomous system. The identification procedure of both the user and surrounding objects goes through an initial phase of creating a model based on features taken from the depth and color information. New information on the user/object detected at each instant (on-the-run/real-time processing) is compared with the existing model and it is decided whether it is recognized the user/object or not based on matching algorithms. The existing model is adapted over time based on AI and learning algorithms, which allow the adjustment of the visual characteristics of the user/object, over time, during its operation.

Based on the matter previously disclosed description, the present improvements introduced in the robotic system allow to solve existing problems in the behavioral response performance level. The presented architecture, allied to the particular configurations of each one of the modules, allows solving the problem of universality of application of an autonomous robot, which through the combination of different techniques and algorithms allows reaching enough versatility to perform several types of functionalities in a single equipment. The problem of the selection of the most effective paths to a pre-determined destination is also overcome, based on the use of using occupation maps, real time corporative identification of obstacles and the use of temporal statistical data, identified obstructions history and top speeds reached. Additionally, the obstacle tracking of users using low profile robots is overcome, implementing detection and tracking of moving objects in static environments, using LIDAR information.

Within the features that are achieved through the combination of elements previously described are:
autonomous and natural navigation based on optimization algorithms configured to choose and define path trajectories;
tracking of robot users in different contexts and environments, either by unequivocal identification of the user or by selective movement detection;
interconnection with factory systems, for device control and automation of loading and unloading procedures of the robotic system;
docking and conveying of mobile structures such as trolleys and benches;

reception and/or dispatch of cargo using different methodologies, such as lifting or connection to roller conveyors;

guiding users to destinations, with operator identification and distance to target insurance;

communication with external remote software systems;

sharing of performance statistics and occupational data with external servers and other robots (cooperative sharing of information);

dynamic obstacle avoidance;

alert communication with external systems;

visual line following capability;

obstacle detection and avoidance at height.

The present description is of course in no way restricted to the embodiments presented herein and a person of ordinary skill in the art may provide many possibilities of modifying it without departing from the general idea as defined in the claims. The preferred embodiments described above are obviously combinable with each other. The following claims further define preferred embodiments.

The invention claimed is:

1. A method to control the autonomous responsive behavior of a robotic system based on a set of simultaneously and cooperatively performed real-time actions comprising:

acquiring sensorial data from predetermined features of a surrounding environment where the robotic system is inserted, wherein said sensorial data is acquired by a Sensory Module through a combination of a range of sensors and cameras comprised therein;

acquiring interactive data from at least a movement or an action or one physiognomy characteristic of a user of the robotic system, wherein said interactive data is acquired by an Interaction Module through a combination of a set of data acquisition means comprised therein;

supplying power to the Sensory and Interaction modules of the robotic system through a Power Module;

providing data locomotion instructions to a Locomotion Module configured to ensure overall movement of the robotic system through locomotion means comprised therein;

exchanging data communication between the robotic system and at least one remote monitoring system, wherein said data communication exchange is provided by a Communication Module through communication means; and safe operation monitoring of the robotic system autonomous responsive behavior through a Safety Management Module through a combination of a set of monitoring means;

wherein said Sensory Module, Interaction Module, Power Module, Locomotion Module, Communication Module and Safety Management Module are comprised in the robotic system and are globally controlled and managed by a Central Processing Module comprising a multitude of control and decision AI algorithms multidirectionally connected to said modules that allow to exchange data therewith and define the autonomous responsive behavior of the robotic system;

wherein the Central Processing Module is configured to:
control the autonomous responsive behavior of the robotic system, by determining a set of routes the robotic system can take based on recorded prior performance statistics, distance to target and obstacle information previously detected;

determine, based on the determined set of routes, the best path to target;

determine, based on a space occupancy map of the surrounding environment and obstacle information identified on-the-run in real time by the Sensory Module, the need to recalculate the path;

evaluate when the target is reached;

control, in a user tracking mode, a switching between operating states;

evaluate human features based on sensor information and decide which detected user is the main target for tracking;

control the distance to the user while tracking, maintaining a target threshold; and wherein the multitude of control and decision AI algorithms of the Central Processing Module comprise a Docking Algorithm, a Mission-Action Translation Algorithm, a Graph Search Algorithm, a Global Planning Algorithm, a Local Planning And Obstacle Avoidance Algorithm, a Task Manager, a Transportation Control Algorithm, a Traffic Control Algorithm, and a Blockage Management Algorithm, a Travel Time Statistics Algorithm, a Vertical Objects And Vault Detection Algorithm, a Logging Algorithm, a Motion Tracking Algorithm, a Mapping And Localization Algorithm, a Diagnostic Algorithm.

2. The method according to claim 1, further comprising transportation management of a cargo to deliver to a predetermined location, said management being ensured through a Transportation Module configured to ensure cargo pickup and replace said cargo, which is further controlled and managed by the Central Processing Module.

3. The method according to claim 1, wherein a combination of data provided by the combination the range of sensors and cameras of the Sensory Module determines a space occupancy map comprising relative height, width and depth information of a surrounding environment and/or objects around the robotic system, as well as ground depressions.

4. The method according to claim 1, wherein the data locomotion instructions are monitored, controlled and provided autonomously by the Central Processing Module, based on the acquired sensorial data, the acquired interactive data, the exchanged data communication and the safe operation monitoring.

5. The method according to claim 1, wherein the Interaction Module are further configured to establish bidirectional point-to-point connections with an external agent in order to ensure at least an autonomous remote operation of the robotic system by at least a remote control or a station, a remote team operation through cooperation of data and instructions with similar robotic systems, or an automatic or supervised software updates to internal hardware comprised in the robotic system.

6. The method according to claim 1, wherein the autonomous responsive behavior of the robotic system comprises at least pick up, transport and replace cargo loads at a determined location; track an individual or a user; open doors; perform warehouse tasks;

and switch between different preprogramed or autonomous operation modes and tasks.

7. The method according to claim 1, wherein the Docking Algorithm recognizes and locates specific targets, said target recognition and location comprising at least shape or color characteristics, based on data acquired from the sensory module, the locomotion module and the transport module.

8. The method according to claim 1, wherein the Mission-Action Translation Algorithm receives orders from a Fleet Management System server by means of the Communication Module and translates said orders or instructions in autonomous actions that the robotic system can interpret and execute, acting over the Locomotion Module through instructions outputted to the Task Manager.

9. The method according to claim 1, wherein the Graph Search Algorithm receives target locations and determines a best possible route to a received target destination based on an evaluation of segments of a navigation grid or a graph.

10. The method according to claim 1 wherein the Global Planning Algorithm receives a route from the Graph Search Algorithm and calculates the best coordinates and orientation to execute the proposed path, ensuring also the avoidance of all known physical obstacles in the determined route to a target destination based on a determined best possible route.

11. The method according to claim 1, wherein the Local Planning and Obstacle Avoidance Algorithm recalculates in real-time each segment of a path covered towards a target destination according to surrounding conditions and obstacles of the robotic system.

12. The method according to claim 1, wherein the Task Manager receives autonomous actions from the surrounding algorithms of the Central Processing Unit and controls the execution of such autonomous actions controlling execution and internal coordination within the Central Processing Module.

13. The method according to claim 1, wherein the Blockage Management Algorithm determines whether the robotic system is blocked or stalled based on the acquired sensorial data.

14. The method according to claim 1 wherein the Transportation Control Algorithm implements all the control logic required to execute the Transportation Module actions, receiving and providing instructions from and to the Task Manager supported by the Communications Module, thus executing the transportation management of a cargo.

15. The method according to claim 1, wherein the Traffic Control Algorithm ensures communication of the Central Processing Module with the Fleet Management System server when the robotic system is entering and leaving traffic hotspot zones.

16. The method according to claim 1, wherein the Travel Time Statistics Algorithm determines journey times for each route and each segment, storing said times locally and on the Fleet Management System server.

17. The method according to claim 1, wherein a Visual Line Follower Algorithm locates and recognizes painted lines on a ground based on the acquired sensorial data and controls the Locomotion Module to navigate the robot in the quest of following line position and direction.

18. The method according to claim 1 wherein the Vertical Objects And Vault Detection Algorithm recognizes objects located over or below a predetermined height, as well as depressions on a ground, based on acquired sensorial data.

19. The method according to claim 1 wherein the Logging Algorithm stores locally and remotely in the Fleet Management System server information about a diagnostic status of each module of the robotic system.

20. The method according to claim 1, wherein a User Tracking Algorithm locates, recognizes and uniquely identifies people, a user of the robotic system, defining a target that the Locomotion Module will use to follow user movements, based on acquired sensorial data.

21. The method according to claim 1 wherein the Motion Tracking Algorithm identifies surrounding movement around the robotic system based on acquired sensorial data.

22. The method according to claim 1, wherein the Mapping and Localization Algorithm stores environment information from the sensorial data acquisition and fuses it in a navigation map which includes surrounding detected obstacles of the robotic system.

23. The method according to claim 1 wherein the Diagnostic Algorithm evaluates hardware and internal software operation status, publishing error signals and generating alarms.

24. A system to control the autonomous responsive behavior of a robot according to the method of claim 1, comprising:
- a combination of modules comprising at least a Sensory Module, a Locomotion Control Module, an Interaction Module, a Power Module, a Safety Management Module, a Transportation Module and a Communication Module;
- a Central Processing Module comprised within the robot which is configured to control and manage said combination of modules through a multitude of control and decision AI algorithms which are multidirectionally connected to said combination of modules allowing to exchange data therewith and define the autonomous responsive behaviors of the robotic system.

* * * * *